United States Patent
Chishima et al.

(10) Patent No.: US 12,468,271 B2
(45) Date of Patent: Nov. 11, 2025

(54) PRODUCTION PLAN OPTIMIZATION APPARATUS, METHOD, NON-TRANSITORY COMPUTER READABLE MEDIUM STORING PROGRAM, AND CONTROL APPARATUS

(71) Applicants: NEC Corporation, Tokyo (JP); NEC Platforms, Ltd., Kawasaki (JP)

(72) Inventors: Hiroshi Chishima, Tokyo (JP); Masayo Kaida, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 407 days.

(21) Appl. No.: 18/017,242

(22) PCT Filed: Jul. 31, 2020

(86) PCT No.: PCT/JP2020/029432
§ 371 (c)(1),
(2) Date: Jan. 20, 2023

(87) PCT Pub. No.: WO2022/024343
PCT Pub. Date: Feb. 3, 2022

(65) Prior Publication Data
US 2023/0297039 A1    Sep. 21, 2023

(51) Int. Cl.
*G05B 13/04* (2006.01)
*G06Q 10/047* (2023.01)

(52) U.S. Cl.
CPC ........... *G05B 13/04* (2013.01); *G06Q 10/047* (2013.01)

(58) Field of Classification Search
None
See application file for complete search history.

(56) References Cited

U.S. PATENT DOCUMENTS

2019/0325338 A1    10/2019   Dukatz et al.

FOREIGN PATENT DOCUMENTS

| JP | 2009-003883 A | 1/2009 |
| JP | 2015-225350 A | 12/2015 |
| JP | 2020-042687 A | 3/2020 |

OTHER PUBLICATIONS

International Search Report for PCT Application No. PCT/JP2020/029432, mailed on Oct. 20, 2020.

*Primary Examiner* — Sean Shechtman
(74) *Attorney, Agent, or Firm* — Sughrue Mion, PLLC

(57) ABSTRACT

A production plan optimization apparatus includes a traveling salesman problem formulation unit for formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces and a processing sequence determination unit for calculating a solution to the traveling salesman problem, by using an annealing processing unit for searching for an optimal solution to a combinatorial optimization problem by simulated annealing or quantum annealing, and determining the sequence in which the plurality of workpieces are processed based on a result of the calculation.

11 Claims, 17 Drawing Sheets

|   | DUE ON DAY WHEN PROCESSING IS PERFORMED | DUE NEXT DAY | DUE THREE DAYS AFTER | DUE FOUR DAYS AFTER | DUE FIVE DAYS AFTER |
|---|---|---|---|---|---|
| GROUP A | ELEMENT BLOCK (20a1) | ELEMENT BLOCK (20a2) | ELEMENT BLOCK (20a3) | ELEMENT BLOCK (20a4) | ELEMENT BLOCK (20a5) |
| GROUP B | ELEMENT BLOCK (20b1) | ELEMENT BLOCK (20b2) | ELEMENT BLOCK (20b3) | ELEMENT BLOCK (20b4) | ELEMENT BLOCK (20b5) |
| GROUP C | ELEMENT BLOCK (20c1) | ELEMENT BLOCK (20c2) | ELEMENT BLOCK (20c3) | ELEMENT BLOCK (20c4) | ELEMENT BLOCK (20c5) |
| GROUP D | ELEMENT BLOCK (20d1) | ELEMENT BLOCK (20d2) | ELEMENT BLOCK (20d3) | ELEMENT BLOCK (20d4) | ELEMENT BLOCK (20d5) |

Fig. 10

PRODUCTION PLAN OPTIMIZATION APPARATUS, METHOD, NON-TRANSITORY COMPUTER READABLE MEDIUM STORING PROGRAM, AND CONTROL APPARATUS

This application is a National Stage Entry of PCT/JP2020/029432 filed on Jul. 31, 2020, the contents of all of which are incorporated herein by reference, in their entirety.

TECHNICAL FIELD

The present disclosure relates to a production plan optimization apparatus, method, a non-transitory computer readable medium storing a program, and a control apparatus.

BACKGROUND ART

In the manufacturing industry, use of an apparatus capable of processing a plurality of types of products (workpieces) such as 3D printers, laser processing apparatuses, and surface mounting apparatuses has become widespread. Each time a workpiece to be processed is changed, a setting of such processing apparatus needs to be changed, which is called a changeover.

Since the processing apparatus will stop while the changeover is being performed, it is necessary to shorten a changeover time as much as possible to improve productivity. In general, the changeover time depends largely on a sequence in which workpieces are processed, because the changeover time depends on the type of workpiece to be processed, such as which workpiece a workpiece is to be switched from and which workpiece a workpiece is to be switched to. However, since the calculation time required to determine an optimal processing sequence increases exponentially upon an increase in the number of workpieces, it has been difficult to determine the optimal processing sequence in a realistic time.

By the way, methods to search for an optimal solution to a combinatorial optimization problem by quantum annealing and simulated annealing have been attracting attention. These methods use quantum or thermal fluctuations to search for such optimal solutions.

A combinatorial optimization problem is a problem regarding searching for an optimal set of variables based on a set evaluation (objective) function. As an example of the combinatorial optimization problem, the traveling salesman problem is known. The traveling salesman problem is, for example, a problem regarding seeking a route with the shortest traveling distance among routes that allows a salesman to visit every city once and then return to the departing city. As a technique for solving the traveling salesman problem, for example, Patent Literature 1 is known.

CITATION LIST

Patent Literature

Patent Literature 1: Japanese Unexamined Patent Application Publication No. 2009-003883

SUMMARY OF INVENTION

Technical Problem

As mentioned above, there has been a problem that it has been difficult to optimize a sequence in which workpieces are processed and minimize a changeover time.

The present disclosure has been made to resolve such a problem. That is, an object of the present disclosure is to provide a production plan optimization apparatus, method, program, and a control apparatus that can reduce a cost of manufacturing a plurality of products by using an apparatus such as a processing apparatus and a manufacturing apparatus.

Solution to Problem

A production plan optimization apparatus according to the present disclosure includes: traveling salesman problem formulation means for formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and processing sequence determination means for calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation.

A production plan optimization method according to the present disclosure causes a computer to execute: formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation.

A production plan optimization program according to the present disclosure causes a computer to execute: processing of formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and processing of calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation.

A control apparatus according to the present disclosure includes: traveling salesman problem formulation means for formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; processing sequence determination means for calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation; and control means for controlling the processing apparatus for processing the plurality of workpieces according to the sequence in which the plurality of workpieces are processed determined by the processing sequence determination means.

Advantageous Effects of Invention

According to the present disclosure, it is possible to reduce a cost of manufacturing a plurality of products by using an apparatus such as a processing apparatus and a manufacturing apparatus.

BRIEF DESCRIPTION OF DRAWINGS

FIG. 10 is an overview diagram showing element blocks each including a collection of ordered workpieces according to delivery dates and groups;

EXAMPLE EMBODIMENT

For clarity of explanation, the following descriptions and drawings have been omitted and simplified as appropriate. In each drawing, the same elements are assigned the same signs, and repeated descriptions are omitted as necessary.

First Example Embodiment

Figure 1:
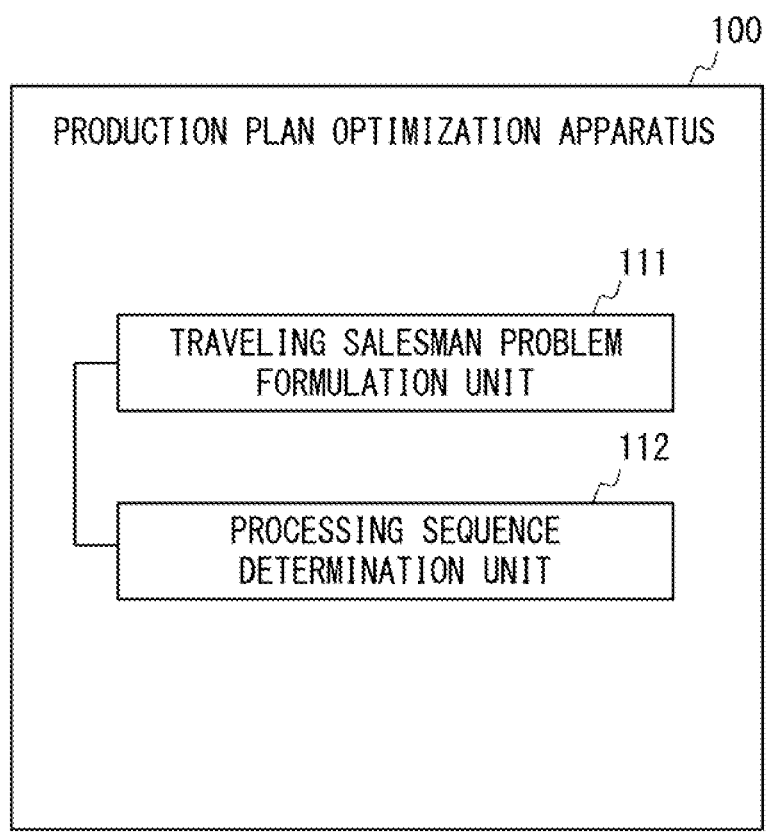
FIG. 1 is a block diagram showing a configuration of a production plan optimization apparatus according to a first example embodiment.

FIG. 1 is a configuration diagram showing a configuration of a production plan optimization apparatus 100 according to a first example embodiment. The production plan optimization apparatus 100 includes a traveling salesman problem formulation unit 111 and a processing sequence determination unit 112. The production plan optimization apparatus 100 is an apparatus for determining a sequence in which a plurality of workpieces are processed. The processing apparatus is an apparatus that can process a plurality of types of products, such as 3D printers, laser processing apparatus, and surface mounting apparatuses. When a printed circuit board is processed, front and back surfaces of the printed circuit board may be treated as separate workpieces.

The production plan optimization apparatus 100 may also include a control unit for controlling an apparatus such as a processing apparatus according to the determined processing sequence. In this case, the production plan optimization apparatus 100 functions as a control apparatus to control apparatuses such as a processing apparatus. In other words, the production plan optimization apparatus 100 can also be said to be a control apparatus that controls an apparatus that executes processing on a plurality of workpieces according to a determined processing sequence.

The traveling salesman problem formulation unit 111 formulates a problem regarding determining the sequence in which a plurality of workpieces are processed as a traveling salesman problem that satisfies predetermined constraint conditions and also minimizes a sum of changeover times associated with switching of workpieces. For example, the problem can be expressed as follows by using an objective function as shown in, for example, Expression 1 and constraints as shown in, for example, Expressions 2 and 3.

[Expression 1]

$$\text{minimize} \sum_{i,j,t} UD_{i,j}(x_{i,t} \cdot x_{j,t+1}) \qquad (1)$$

Here, $UD_{i,j}$ indicates a changeover time when a workpiece is switched from a workpiece i to a workpiece j. $x_{i,t}$ is 1 when the workpiece i is executed t-th. $x_{i,t}$ is 0 otherwise.

[Expression 2]

$$\sum_{t}\left(\sum_{i} x_{i,t} - 1\right)^2 = 0 \qquad (2)$$

[Expression 3]

$$\sum_{i}\left(\sum_{t} x_{i,t} - 1\right)^2 = 0 \qquad (3)$$

In this case, Expression 1 indicates processing of seeking a time when the total changeover time at the time of switching a workpiece from the workpiece i to the workpiece j is the minimum. Expression 2 indicates a condition that only one workpiece is processed at a time. Expression 3 indicates a condition that each workpiece is processed only once. However, the expressions of the traveling salesman problem are not limited to Expressions 1 to 3, and instead may be an expression that minimizes the total changeover time required to process workpieces.

Here, each of the plurality of workpieces corresponds to each city in the traveling salesman problem, and the changeover time associated with the switching of workpieces corresponds to a distance between cities in the traveling salesman problem. The predetermined constraint conditions will be discussed later.

The traveling salesman problem described above may be, for example, a problem regarding seeking a route that visits all cities once with the shortest travel distance. In other words, the traveling salesman problem described above does not have to be a problem regarding seeking a route returning to the departing city. In the traveling salesman problem described above, the workpiece corresponding to the departing city may be defined in advance. For example, the workpiece corresponding to the departing city may be the workpiece processed at the end of the previous day.

When the sequence in which the workpieces are processed is determined, it is necessary to take into consideration a delivery date set for the workpiece and the constraints on the sequence in which the workpieces are processed. The predetermined constraint conditions described above are to satisfy a delivery date constraint based on the delivery date specified for at least one of the plurality of workpieces and a sequence constraint specified for at least one of combinations of the plurality of workpieces.

First, the delivery date constraint is explained. It is assumed that a delivery date is specified for at least one of the plurality of workpieces. Alternatively, delivery dates may be specified for the plurality of workpieces, respectively. The delivery date constraint is a constraint that prioritizes the processing of the workpiece whose delivery date is close. For example, the delivery date constraint is a constraint in which the turn of processing the workpiece whose delivery date is the day when processing is to be performed is moved forward so that the turn of processing the workpiece becomes smaller than a predetermined value. If the predetermined value is (½) of the number of workpieces, the workpieces to be delivered on the day when the processing work task is to be performed can be processed in the first half of the day. The delivery date constraint can be expressed, for example, as in Expression 4.

[Expression 4]

$$\text{Penalty} = \sum_{t>T} \sum_{i \in DL} x_{i,t} \qquad (4)$$

Here, DL indicates a workpiece due today. T indicates a turn in which the workpieces are processed to meet today's delivery date.

Next, the sequence constraint is described. If there are two workpieces, one of them may have to be processed before the other. For example, in the processing of printed circuit boards, it is sometimes prohibited, in manufacturing, from processing the front surface before the back surface. The sequence constraint is, for example, a constraint to determine the processing sequence so that the prohibited sequence is not included in such a case. In the traveling salesman problem, the sequence constraint corresponds to a constraint that a predetermined city is to be visited later than another predetermined city. The constraint can be expressed as, for example, Expression 5.

[Expression 5]

$$\text{Penalty} = \sum_{to, from \in pdb} \sum_{t} \sum_{after\_t} x_{to,t} \cdot x_{from, after\_t} \qquad (5)$$

Here, pdb is a set that includes a combination of elements that do not satisfy the sequence constraint.

The sequence constraint may be a constraint specifying the sequence of three or more workpieces. In addition, if the processing sequence for a group of plurality of workpieces is specified in advance, the sequence constraint may be defined to follow the order. Here, the group is a collection of workpieces having a short changeover time, for example, a collection of workpieces having common members used in processing.

The processing sequence determination unit 112 calculates a solution to the traveling salesman problem by using an annealing processing unit 140 (not shown) and determines the sequence in which the workpieces are processed based on the calculation result. The annealing processing unit 140 has a function of searching for an optimal solution to the combinatorial optimization problem by simulated annealing or quantum annealing. In this case, the annealing processing unit 140 performs processing to obtain $x_{i,t}$ when H is minimum, as shown, for example, in Expressions 6 to 11, or operates to obtain $x_{i,t}$ when H is minimum.

[Expression 6]

$$H_1 = \sum_{i,j,t} UD_{i,j}(x_{i,t} \cdot x_{j,t+1}) \qquad (6)$$

[Expression 7]

$$H_2 = \sum_{t} \left( \sum_{i} x_{i,t} - 1 \right)^2 \qquad (7)$$

[Expression 8]

$$H_3 = \sum_{i} \left( \sum_{t} x_{i,t} - 1 \right)^2 \qquad (8)$$

[Expression 9]

$$H_4 = \sum_{t>T} \sum_{i \in DL} x_{i,t} \qquad (9)$$

[Expression 10]

$$H_5 = \sum_{to, from \in pdb} \sum_{t} \sum_{after_t} x_{to,t} \cdot x_{from, after_t} \qquad (10)$$

[Expression 11]

$$H = W_1 H_1 + W_2 H_2 + W_3 H_3 + W_4 H_4 + W_5 H_5 \qquad (11)$$

Note that $W_1$, $W_2$, $W_3$, $W_4$, and $W_5$ are numerical values representing weights. The expressions of the traveling salesman problem are not limited to the above examples, and instead may be an expression that minimizes the total changeover time required to process each workpiece.

The annealing processing unit 140 may be included in the production plan optimization apparatus 100 or may be an apparatus provided outside the production plan optimization apparatus 100.

The above processing can also be expressed as follows. The annealing processing unit 140 calculates an evaluation value (objective function value) for a total time of a switching time required to process a plurality of workpieces in a sequence in which the plurality of workpieces are processed by using a changeover time indicating a time taken for switching at least two workpieces among the plurality of workpieces and a constraint condition (sequence constraint) on the sequence in which some of the workpieces are processed. Next, the annealing processing unit 140 determines the sequence in which the workpieces are processed when the calculated evaluation value (objective function value) becomes the minimum. The annealing processing unit 140 may calculate a plurality of evaluation values, and then determine the sequence in which the workpieces are processed which satisfies the condition for determining that the evaluation value is small among the calculated evaluation values. The condition is, for example, the condition that the evaluation value is the smallest among the plurality of evaluation values. Alternatively, the condition is that, for example, when the operation of calculating the evaluation value is repeated, the evaluation value becomes smaller than the previous evaluation value. The condition may be, for example, that the evaluation value is less than a threshold value for determining an end of the operation. Such conditions are not limited to the examples described above. In addition, the control unit may control the apparatus for executing processing on the plurality of workpieces according to the determined processing sequence.

The annealing processing unit 140 may be dedicated hardware that searches for an optimal solution to the combinatorial optimization problem by, for example, simulated annealing. Such dedicated hardware is referred to as an annealing machine. The annealing processing unit 140 may also be a quantum computer that searches for an optimal solution to the combinatorial optimization problem by quantum annealing. The processing sequence determination unit 112 can determine the sequence in which the workpieces are processed in a shorter time by using the annealing processing unit 140 which searches for an optimal solution to the combinatorial optimization problem using thermal fluctuations, quantum fluctuations, etc.

Thus, the production plan optimization apparatus 100 formulates the problem regarding determining the sequence in which the workpieces are processed as the traveling salesman problem with constraint conditions, and determines the processing sequence based on the result of searching for the optimal solution. Therefore, the production plan optimization apparatus 100 can determine the optimal sequence in which the workpieces are processed. Furthermore, by controlling the apparatus according to the determined processing sequence, the cost of manufacturing a plurality of products using an apparatus such as a processing apparatus and manufacturing apparatus can be reduced.

Figure 2:
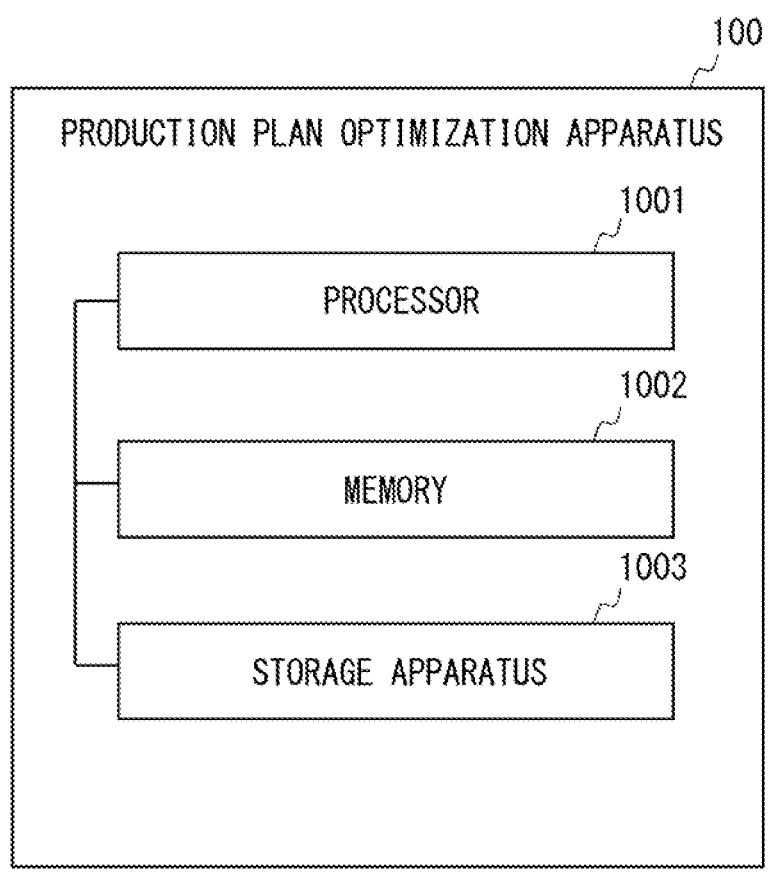
FIG. 2 is a block diagram showing an example of a hardware configuration of the production plan optimization apparatus.

FIG. 2 shows an example of a hardware configuration of the production plan optimization apparatus 100. The production plan optimization apparatus 100 includes a processor 1001, a memory 1002, and a storage apparatus 1003. The storage apparatus 1003 stores a computer program in which processing of a calculation method according to the first example embodiment is implemented. The processor 1001 reads the computer program from the storage apparatus 1003 into the memory 1002 and executes the computer program. By doing so, the processor 1001 implements the functions of the traveling salesman problem formulation unit 111 and the processing sequence determination unit 112.

Alternatively, each of the traveling salesman problem formulation unit 111 and the processing sequence determination unit 112 may be implemented by dedicated hardware. Further, some or all of the constituent elements of each apparatus may be implemented by general-purpose or dedicated circuitry, processors, etc., or a combination thereof. These constituent elements may be composed of a single chip or a plurality of chips connected via a bus. Some or all of the constituent elements of each apparatus may be implemented by a combination of the circuitry, the program, and the like described above. The processor may be a CPU (Central Processing Unit), a GPU (Graphics Processing Unit), an FPGA (field-programmable gate array), or the like.

Further, when some or all of the constituent elements of the production plan optimization apparatus 100 are implemented by a plurality of information processing apparatuses, circuitry, etc., the plurality of information processing apparatuses, circuitry, and the like, may be collectively arranged or arranged separate from each other. For example, the information processing apparatus, the circuitry, and the like may be implemented as a form where they are connected to each other via a communication network, such as a client server system, a cloud computing system, and the like. Further, the function of the production plan optimization apparatus 100 may be provided in a SaaS (Software as a Service) format.

Second Example Embodiment

A second example embodiment is a specific example of the first example embodiment. Hereinafter, a case in which workpieces to be processed per day are determined and a processing schedule per day is determined will be mainly explained, but this example embodiment is not limited to this case. For example, a processing schedule for three days may be determined. Descriptions that are common to those in the first example embodiment are omitted in the following descriptions.

Figure 3:
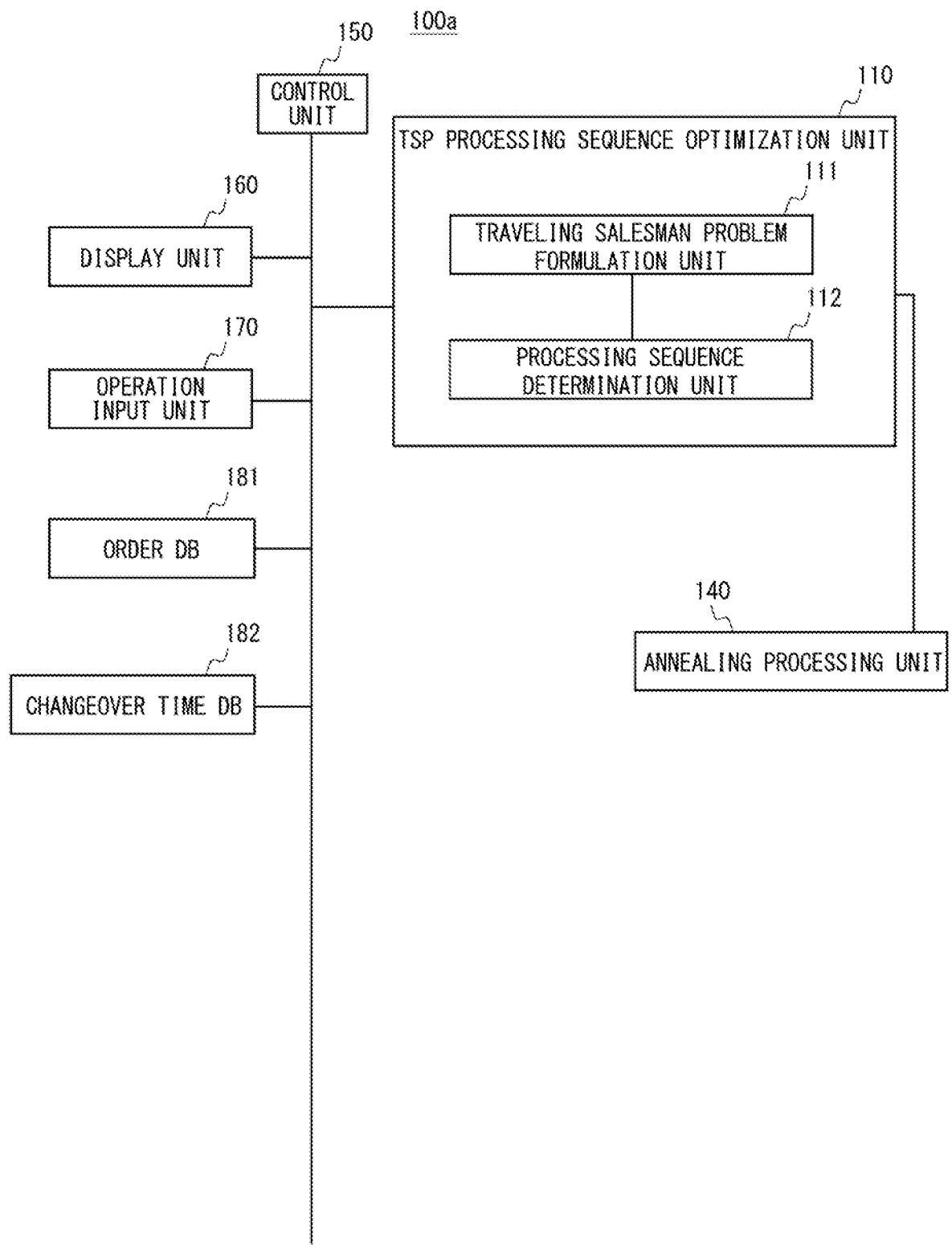
FIG. 3 is a block diagram showing a configuration of a production plan optimization apparatus according to a second example embodiment.

FIG. 3 is a configuration diagram showing a configuration of a production plan optimization apparatus 100*a* according to the second example embodiment. The production plan optimization apparatus 100*a* includes a control unit 150, a display unit 160, an operation input unit 170, an order DB (Data Base) 181, a changeover time DB 182, a TSP (Traveling Salesman Problem) processing sequence optimization unit 110, and an annealing processing unit 140.

The control unit 150 controls the entire process in the production plan optimization apparatus 100*a*. The display unit 160 is a display apparatus such as a display. The display unit 160 displays a sequence in which workpieces are processed determined by the TSP processing sequence optimization unit 110.

The control unit 150 may also include a control unit for controlling an apparatus such as a processing apparatus according to the determined processing sequence. In other words, the control unit 150 may include a function of controlling an apparatus that performs processing on a plurality of workpieces according to the determined processing sequence. In this case, the production plan optimization apparatus 100*a* functions as a control apparatus to control an apparatus such as a processing apparatus.

The operation input unit 170 is composed of a mouse, a keyboard, and the like operated by a user. The user perform an input operation to the operation input unit 170 to cause the production plan optimization apparatus 100*a* to perform a calculation for determining the processing sequence.

The order DB 181 is a database that associates ordered workpiece with delivery dates. The workpieces to be processed per day shall be previously selected from the ordered workpiece. The changeover time DB 182 records the changeover time associated with switching of the workpieces.

The TSP processing sequence optimization unit 110 includes the traveling salesman problem formulation unit 111 and the processing sequence determination unit 112. The traveling salesman problem formulation unit 111 formulates a traveling salesman problem in which each of the plurality of workpieces to be processed is defined as a node, and the cost between the nodes is defined as a changeover time based on the changeover time DB 182, and the sum of the costs under predetermined constraint conditions is minimized. The plurality of workpieces may include the workpiece processed at the end of the previous day, and the workpiece processed at the end of the previous day may be used as a departing place in the traveling salesman problem. The predetermined constraint conditions are the delivery date constraint based on the order DB 181 and the constraint condition related to the sequence in which the workpieces are processed. The production plan optimization apparatus 100a may include a sequence constraint DB (not shown) that records constraints related to the sequence in which the workpieces are processed.

The traveling salesman problem formulation unit 111 may formulate a traveling salesman problem so that, for example, the turn of processing the workpiece whose delivery date is the day on which the workpiece is to be processed is moved forward of a predetermined turn. In such a case, the processing of the workpiece whose delivery date is the day on which the workpiece is to be processed is prioritized, and it thus becomes possible to meet the delivery date.

The traveling salesman problem formulation unit 111 may determine the processing sequence so that processing is performed in the sequence of groups. Here, the group is a collection of workpieces that have a short changeover time. The changeover time can be shortened by performing processing in groups. In such a case, the traveling salesman problem formulation unit 111 may formulate a traveling salesman problem in which a sequence in which groups are processed is defined in advance as a group sequence, the group sequence is followed, and a sum of changeover times is minimized. A constraint expression expressing the group sequence can be expressed as, for example, Expression 12.

[Expression 12]

$$\text{Penalty} = \sum_{to, from \in gdb} \sum_{t} \sum_{after\_t} x_{to,t} \cdot x_{from, after\_t} \quad (12)$$

Here, gdb is a set that contains as elements combinations that do not satisfy the group sequence constraint. The group sequence constraint is not limited to the examples described above.

The processing sequence determination unit 112 uses the annealing processing unit 140 to calculate a solution to the above traveling salesman problem with the constraint conditions and determines a processing sequence based on the calculation result. The annealing processing unit 140 may be an annealing machine that can efficiently solve the combinatorial optimization problem by using simulated annealing. The annealing processing unit 140 may also be a quantum computer that calculates a solution to a combinatorial optimization problem by quantum annealing. The annealing processing unit 140 may solve the combinatorial optimization problem by quantum annealing using the quantum Monte Carlo method or the like. The processing sequence determination unit 112 causes the display unit 160 to display the determined processing sequence.

Lastly, the effect of the second example embodiment is explained. A processing apparatus that can process a plurality of types of products used in a production line, called a mixed-flow production line, requires a changeover time each time the type of product (workpiece) to be processed changes. Thus, there has been a need to minimize this changeover time. Since the changeover time varies depending on which workpiece to switch from and which workpiece to be switched to, the sum of the changeover time varies depending on the processing sequence. Therefore, the processing sequence (production plan) determines productivity.

When a production plan is established based on human experience and intuition, there has been a problem that the dependency on individual skills is high, the accuracy of the production plan that could be prepared is limited, and it takes several tens of minutes to several hours to develop the production plan. Therefore, it is desirable to automate the preparation of production plans, but the problem regarding determining the optimal processing sequence is regarded as an NP-hard problem. There has been a problem that the calculation time increases exponentially as the number of types of workpieces to be processed increases, making it impossible to perform the calculation in a practical time.

The production plan optimization apparatus according to the second example embodiment formulates a problem regarding determining the processing sequence as the traveling salesman problem, and calculates, by using annealing means, the sequence in which workpieces are processed with the changeover time minimum. Therefore, the production plan optimization apparatus according to the second example embodiment can determine the optimal production plan of workpieces. Furthermore, by controlling the apparatus according to the determined production plan, the cost of manufacturing a plurality of products by using an apparatus such as a processing apparatus and a manufacturing apparatus can be reduced.

Third Example Embodiment

A third example embodiment is a modified example of the second example embodiment. A container for storing members used may be connected to a processing apparatus used for processing. Such a container is called a cassette. The member may be a material used by a 3D printer or the like or a part mounted by a surface mounting apparatus. In such a case, switching workpieces with different members used requires time for replacing the cassette. Therefore, the changeover time between workpieces with different members used is shorter than that between workpieces with the same members used.

Preparing for cassette replacement may take a long time. In such a case, processing and preparation for cassette replacement are carried out in parallel. A production plan optimization apparatus 100b according to the third example embodiment is an apparatus for determining an optimal processing sequence in such a case. Specifically, the production plan optimization apparatus 100b first determines the sequence in which groups are processed, and then determines the processing sequence by a method similar to that according to the second example embodiment. The group is a collection of a plurality of workpieces according to a commonality of the types of workpieces such as members, jigs, and tools.

Figure 4:
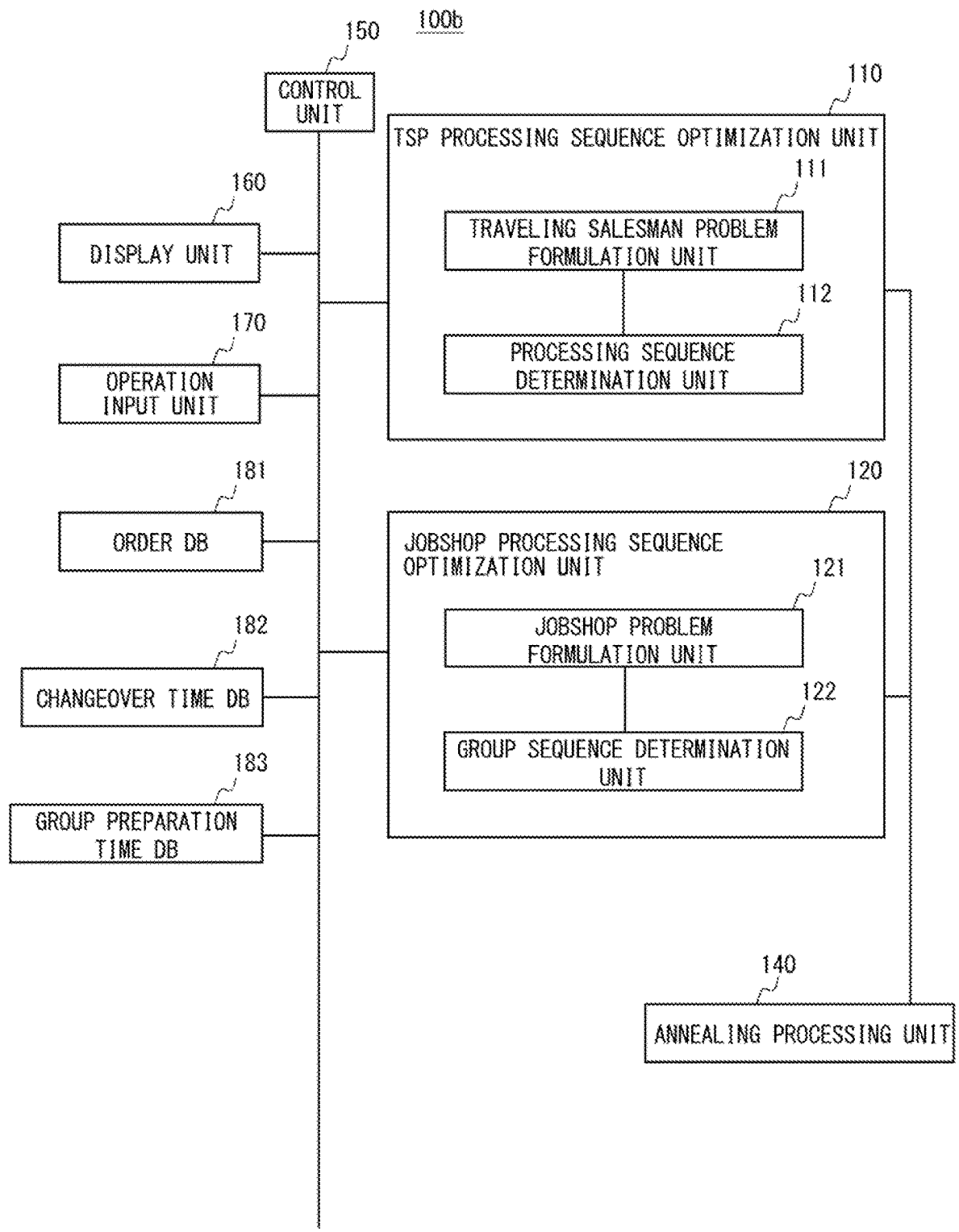
FIG. 4 is a block diagram showing a configuration of a production plan optimization apparatus according to a third example embodiment.

FIG. 4 is a configuration diagram showing a configuration of the production plan optimization apparatus 100b according to the third example embodiment. The production plan optimization apparatus 100b includes a control unit 150, a display unit 160, an operation input unit 170, an order DB 181, a changeover time DB 182, a group preparation time DB 183, a TSP processing sequence optimization unit 110, a JobShop processing sequence optimization unit 120, and an annealing processing unit 140. The functions of the control unit 150, the display unit 160, the operation input unit 170, the order DB 181, the changeover time DB 182, and the annealing processing unit 140 are the same as those according to the second example embodiment, and thus descriptions thereof are omitted.

The group preparation time DB 183 records the time required for preparation of production of groups (group preparation time). The group preparation time may be the time required to prepare for cassette replacement associated with switching of groups. In the changeover time DB 182, the time required for the changeover time other than the group preparation time may be recorded.

The JobShop processing sequence optimization unit 120 formulates a jobshop problem by using the group processing time required for processing the workpieces included in the group and the group preparation time, and determines the sequence in which the groups are processed by solving the jobshop problem. The sequence in which groups are processed is called a group sequence. The jobshop problem can be formulated as, for example, Expression 13.

[Expression 13]

$$\text{minimize} \sum_{i,j,t1,t2} SD_{i,j}(g_{i,t1} \cdot g_{j,t2}) \quad (13)$$

Here, $SD_{i,j}$ indicates a waiting time in the processing apparatus when a group is switched from a group i to a group j. $SD_{i,j}$ corresponds to a difference between the group preparation time and the group processing time. If the group i is executed at a time t, $g_{i,t}$ is 1, otherwise 0. The value of Expression 13 is also obtained under the conditions that all groups are processed only once and that the processing times of the groups must not overlap each other. The expression of the jobshop problem is not limited to the above example, and instead may be an expression that minimizes the total waiting time required to process each group.

In determining the group processing time, the production plan optimization apparatus 100b may formulate a preliminary traveling salesman problem and determine the processing sequence within each group by calculating a solution. The preliminary traveling salesman problem is formulated so that the distance between the groups is sufficiently long. In such cases, the optimal solution to the traveling salesman problem is to visit each group once.

Figure 5:
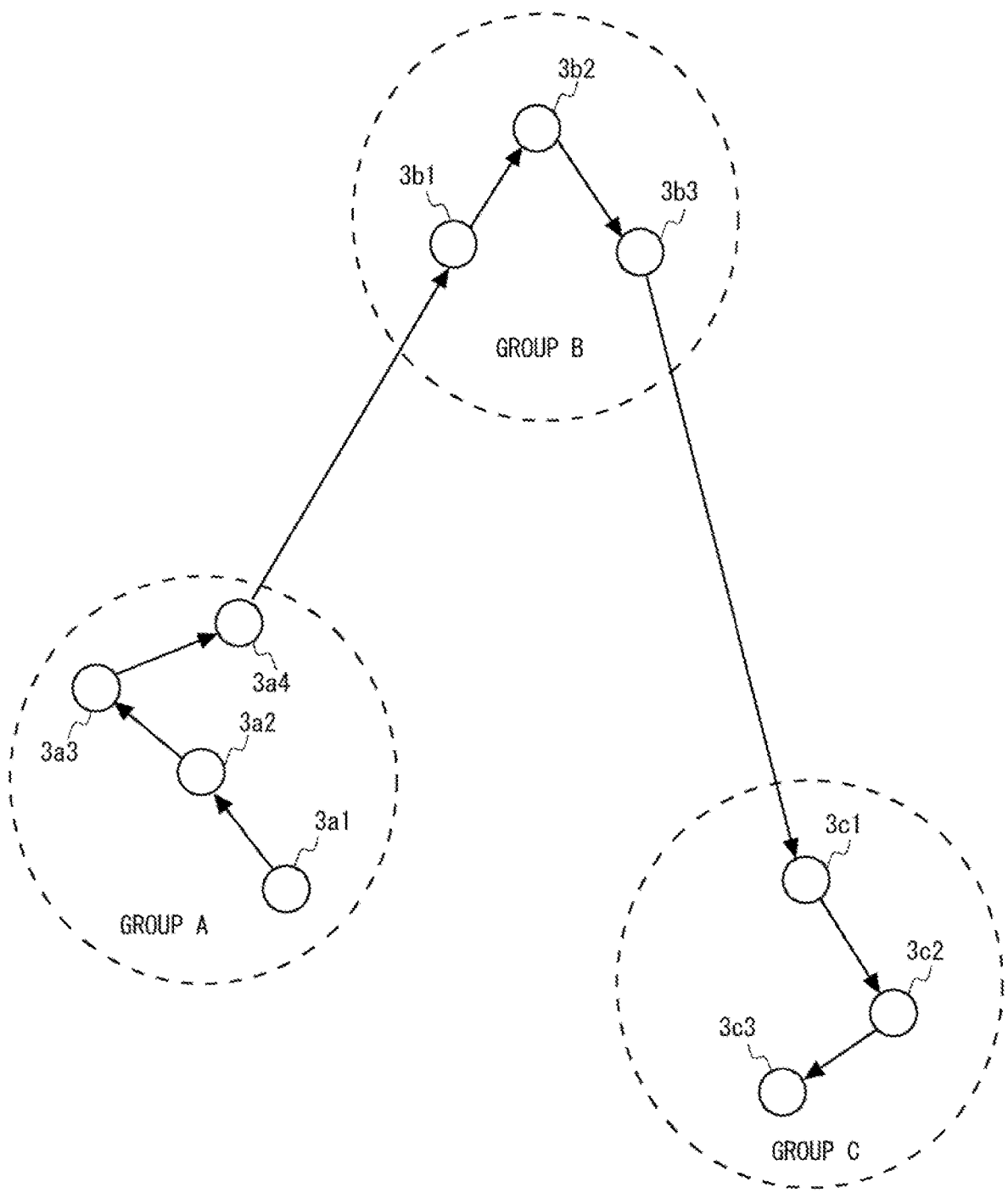
FIG. 5 is an overview diagram showing an overview of a method for determining a processing sequence within each group.

FIG. 5 is an overview diagram showing an overview of the preliminary traveling salesman problem. In FIG. 5, each workpiece is classified into the group A, B, or C. Nodes 3a1, 3a2, 3a3, and 3a4 belong to the group A. Note that the node 3a1 may correspond to the workpiece performed at the end of the previous day. Similarly, nodes 3b1, 3b2, and 3b3 belong to the group B. Furthermore, nodes 3c1, 3c2, and 3c3 belong to the group C. The nodes belonging to the group A, the nodes belonging to the group B, and the nodes belonging to the group C are sufficiently distant from each other.

In FIG. 5, the paths indicated by arrows represent the optimal solutions to the preliminary traveling salesman problem. By solving the traveling salesman problem, the production plan optimization apparatus 100b can determine the sequence in which workpieces are processed in the group A, the sequence in which workpieces are processed in the group B, and the sequence in which workpieces are processed in the group C. Next, the production plan optimization apparatus 100b can calculate the changeover time within the group from the determined processing sequence and calculate the group processing time. It is assumed that the time required for processing each workpiece is registered in advance in the order DB 181 or the like. For example, the group processing time of the group B is the sum of the time required for processing the workpiece corresponding to the node 3b1, the changeover time between the workpieces corresponding to the node 3b1 and the workpiece corresponding to the node 3b2, the time required for processing the workpiece corresponding to the node 3b2, the changeover time between the workpiece corresponding to the node 3b2 and the workpiece corresponding to the node 3b3, and the time required for processing the workpiece corresponding to the node 3b3.

The JobShop processing sequence optimization unit 120 determines the optimal sequence in which the groups are processed based on the group processing time based on the solution to the preliminary traveling salesman problem and the group preparation time DB 183.

Returning to FIG. 4, the JobShop processing sequence optimization unit 120 includes a jobshop problem formulation unit 121 and a group sequence determination unit 122. The jobshop problem formulation unit 121 formulates a problem regarding determining the sequence in which the groups are processed based on the group processing time and the group preparation time DB 183 as a jobshop problem. The sequence in which the groups are processed is also referred to as a group sequence.

Specifically, the jobshop problem formulation unit 121 formulates a jobshop problem that minimizes the sum of the waiting times in the processing apparatus in a case where, after preparation for production of the group is made outside the processing apparatus, the processing apparatus starts the processing of the group for which the production preparation is made.

Figure 6:
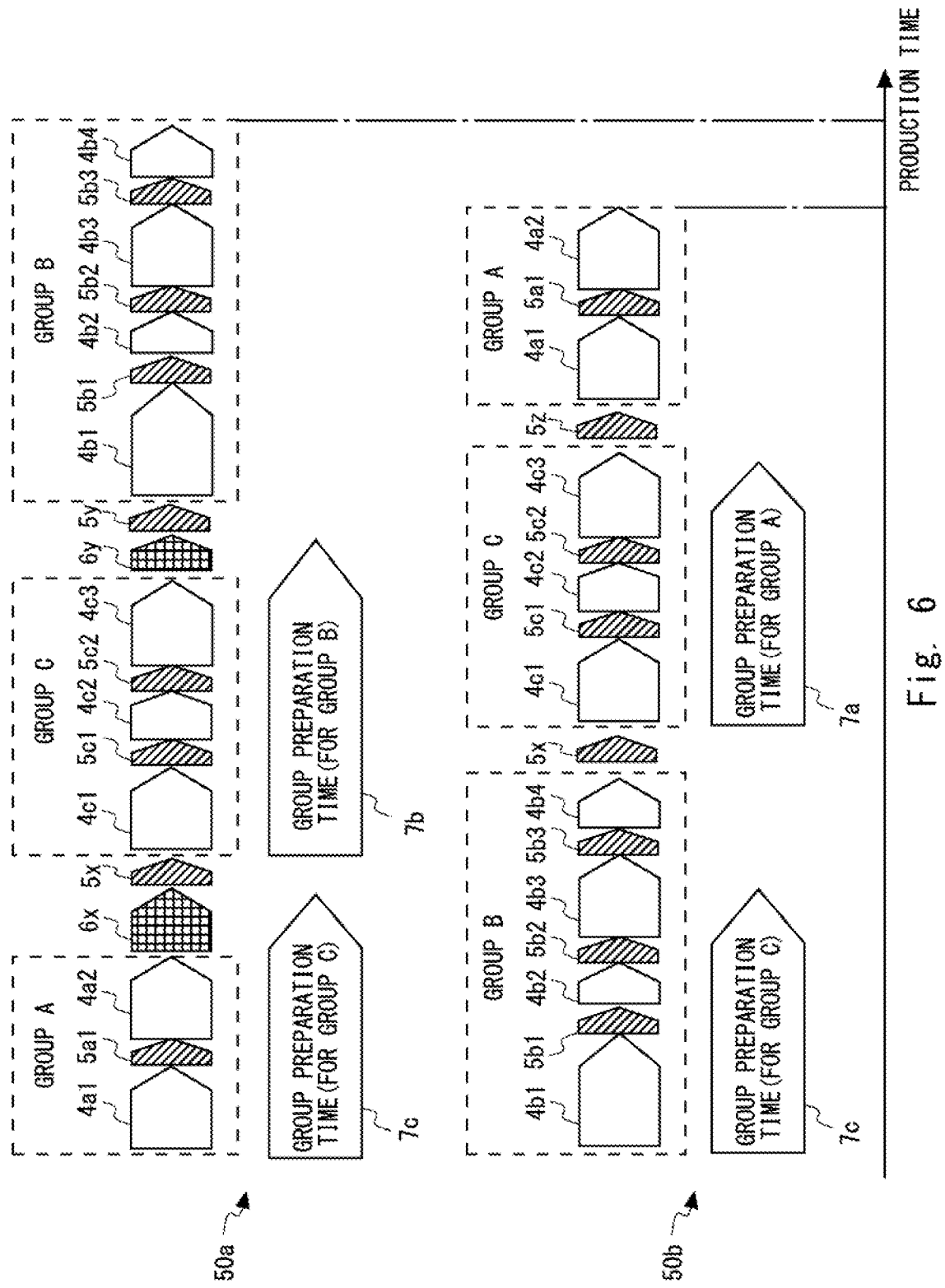
FIG. 6 is an overview diagram showing an example of a schedule of processing in groups.

The jobshop problem formulated by the jobshop problem formulation unit 121 will be explained with reference to FIG. 6. Schedules 50a and 50b shown in FIG. 6 are candidates for the solution to the jobshop problem. The horizontal axis represents the production time. The schedule 50a is the processing schedule when processing is performed in the sequence of the group A, the group C, and the group B. The schedule 50b is the processing schedule when processing is performed in the sequence of the group B, the group C, and the group A. Workpiece processing times 4a1, 4a2, 4b1, 4b2, 4b3, 4b4, 4c1, 4c2, and 4c3 are the times required to process the respective workpieces. Upper parts of the schedules 50a and 50b show work tasks performed in the processing line, and the lower parts of the schedules 50a and 50b are work tasks performed outside the processing line.

As mentioned above, the processing sequence within the group is obtained by solving a preliminary traveling salesman problem.

Changeover times Sal, 5b1, 5b2, 5b3, 5c1, 5c2, 5x, 5y, and 5z are based on the changeover time DB 182. The changeover times 5*x*, 5*y*, and 5*z* can be said to be the parts of the changeover time associated with switching of the groups, excluding the group preparation time. In addition, for example, the changeover time 5*x* may be the time required for setting the processing apparatus when the workpiece corresponding to the workpiece processing time 4*c*1 is processed.

The group preparation times 7*a*, 7*b*, and 7*c* are the times required for the preparation for the production of the groups and are based on the group preparation time DB 183. The group preparation time 7*a* is the time required to prepare production of the group A, the group preparation time 7*b* is the time required to prepare production of the group B, and the group preparation time 7*c* is the time required to prepare production of the group C. The waiting times 6*x* and 6*y* are the waiting times in the processing apparatus. For example, in the schedule 50*a*, when processing of the group A is completed, it is impossible to start processing the group C, because preparation for production of the group C is not completed. In such a case, the waiting time of 6*x* occurs in the processing apparatus.

The jobshop problem formulation unit 121 may formulate a jobshop problem regarding minimizing the time to complete the processing of a plurality of groups. The formulation of the jobshop problem can be said to minimize the waiting time in the processing apparatus. The jobshop problem formulation unit 121, for example, combines the preparation for the production of the group and the processing of the group for which the preparation for the production is made as a job. The processing shall take place in the processing apparatus (in the processing line) and preparation shall take place outside the processing apparatus (outside the processing line). This imposes a constraint that processing of the group for which the preparation for the production is made is started after the preparation for the production is completed. A constraint may also be imposed that, after the preparation for the production is completed, preparation for the production will not be started until the processing of the corresponding group is started. In FIG. 6, the group preparation time of the group to be processed first is not considered, but it may be considered.

Figure 7:
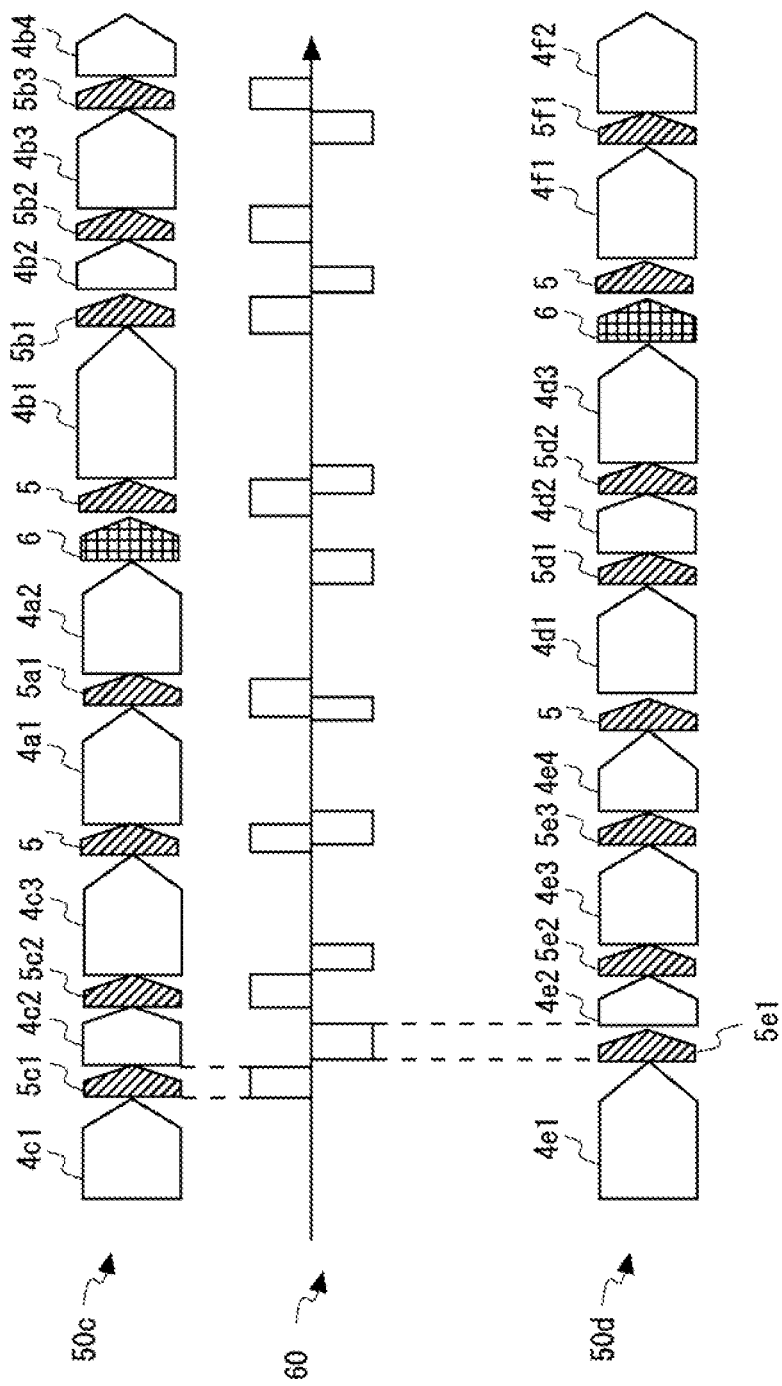
FIG. 7 is an overview diagram showing a schedule for processing by using a plurality of processing apparatuses.

In addition, the jobshop problem formulation unit 121 may determine the processing sequence within the group when processing is performed by using the plurality of lines. FIG. 7 is an overview diagram showing an example of a schedule when processing is performed by using a plurality of processing apparatuses. A schedule 50*c* is the processing schedule of a first processing apparatus, and a schedule 50*d* is the processing schedule of a second processing apparatus, which is different from the first processing apparatus. The schedule 50*c* includes workpiece processing times 4*a*1 to 4*a*2 for workpieces belonging to the group A, workpiece processing times 4*b*1 to 4*b*4 for workpieces belonging to the group B, and workpiece processing times 4*c*1 to 4*c*3 for workpieces belonging to the group C. The schedule 50*d* includes workpiece processing times 4*d*1 to 4*d*3 for workpieces belonging to the group D, workpiece processing times 4*e*1 to 4*e*4 for workpieces belonging to the group E, and workpiece processing times 4*f*1 to 4*f*2 for workpieces belonging to the group F. Changeover times 5 represent the changeover times associated with switching of the groups. Waiting times 6 are waiting times in the processing apparatus.

When a schedule is generated in the case where a plurality of processing apparatuses are used, the schedule may be determined so that the overlap of changeover times in a plurality of lines becomes short. This is because when a single worker performs changeover of the apparatuses, it is not possible to perform changeover in two processing apparatuses at the same time. An upper part of a time chart 60 in FIG. 6 represents a time period during which changeover is performed in the first processing apparatus, and a lower part thereof represents a time period during which changeover is performed in the second processing apparatus. The jobshop problem formulation unit 121 may formulate a jobshop problem by imposing constraints such that the two changeover times do not overlap. The time period during which the changeover is performed in each processing apparatus may be determined based on the processing sequence within the group.

Returning to FIG. 4, the group sequence determination unit 122 of the JobShop processing sequence optimization unit 120 uses the annealing processing unit 140 to calculate a solution to the schedule problem formulated by the jobshop problem formulation unit 121 and determines the group sequence based on the calculation result. For example, in FIG. 6, it is assumed that the schedule 50*b* is the optimal solution. In such a case, it can be said that the working efficiency is improved, because the processing time is shorter than the processing time when the other schedule 50*a* is used.

The traveling salesman problem formulation unit 111 of the TSP processing sequence optimization unit 110 formulates a traveling salesman problem including the group sequence determined by the JobShop processing sequence optimization unit 120 as a sequence constraint. Then, the processing sequence determination unit 112 determines the processing sequence by the annealing processing unit 140 solving the traveling salesman problem.

Figure 8:
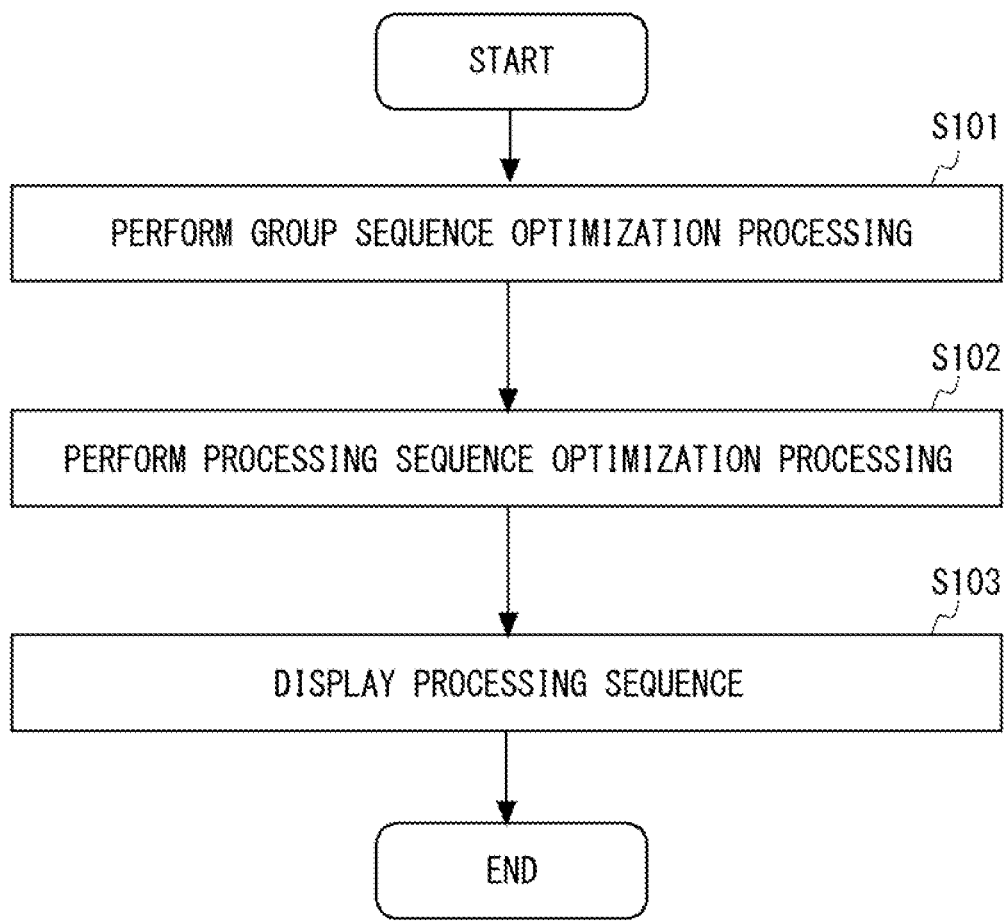
FIG. 8 is a flowchart showing an operation of a production plan optimization apparatus according to a third example embodiment.

FIG. 8 is a flowchart showing an operation of the production plan optimization apparatus 100*b* according to the third example embodiment. The production plan optimization apparatus 100*b* first groups the plurality of workpieces to be processed on the day for each group and determines the optimal group sequence (Step S101). Here, the production plan optimization apparatus 100*b* may determine the group sequence so that the sum of the waiting times is reduced and the time required for the all processing work tasks is reduced.

Next, the production plan optimization apparatus 100*b* determines the sequence in which workpieces are processed which follows the group sequence determined in Step S101 with the minimized sum of the changeover times (Step S102). Finally, the production plan optimization apparatus 100*b* causes the display unit 160 to display the determined processing sequence (Step S103).

The production plan optimization apparatus 100*b* according to the third example embodiment determines a group sequence in consideration of a group preparation time and determines a sequence in which workpieces are processed with the group sequence as a sequence constraint. Therefore, the production plan optimization apparatus 100*b* can reduce a waiting time and improve working efficiency. Furthermore, by controlling the apparatus according to the determined processing sequence, the cost of manufacturing a plurality of products by using an apparatus such as a processing apparatus and a manufacturing apparatus can be reduced.

Fourth Example Embodiment

The production plan optimization apparatus according to the third example embodiment determines a sequence in which workpieces are processed previously defined. A production plan optimization apparatus 100c according to a fourth example embodiment selects a plurality of workpieces to be processed from a set of ordered workpieces. The production plan optimization apparatus 100c selects, for example, a plurality of workpieces so that delivery dates of the ordered workpieces are met and as many workpieces as possible can be processed.

Figure 9:
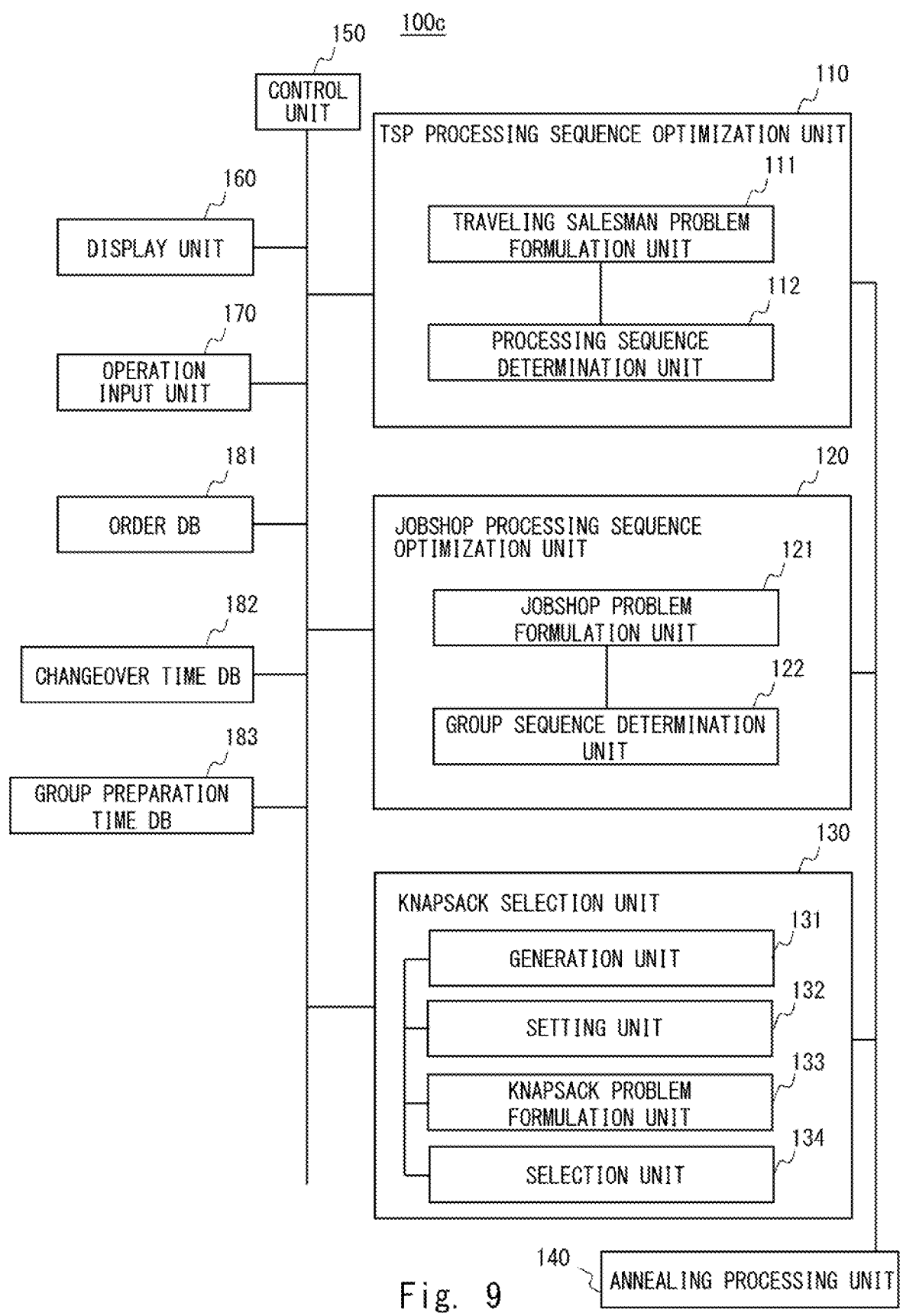
FIG. 9 is a block diagram showing a configuration of a production plan optimization apparatus according to a fourth example embodiment.

FIG. 9 is a block diagram showing a configuration of the production plan optimization apparatus 100c according to a fourth example embodiment. The production plan optimization apparatus 100c includes a control unit 150, a display unit 160, an operation input unit 170, an order DB 181, a changeover time DB 182, a group preparation time DB 183, a TSP processing sequence optimization unit 110, a JobShop processing sequence optimization unit 120, a Knapsack selection unit 130, and an annealing processing unit 140. Since the functions other than the Knapsack selection unit 130 are the same as those according to the third example embodiment, descriptions thereof are omitted.

The Knapsack selection unit 130 includes a generation unit 131, a setting unit 132, a knapsack problem formulation unit 133, and a selection unit 134. The order DB 181 may store delivery dates of ordered workpieces and times required for processing. The ordered workpieces shall be classified into several groups.

For each of the plurality of groups, the generation unit 131 generates a block combining the ordered workpieces classified into the group. The block may include a plurality of ordered workpieces. The generation unit 131 may generate a plurality of blocks for each of the plurality of groups.

For each of the plurality of blocks generated by the generation unit 131, the setting unit 132 calculates a block processing time required for processing the ordered workpieces included in the block. When the block includes a plurality of ordered workpieces, the setting unit 132 may formulate a traveling salesman problem with the changeover time associated with switching of the ordered workpieces as a traveling cost and determine the processing sequence within the block. Since the changeover time can be calculated from the determined processing sequence, the setting unit 132 can calculate the block processing time taking the changeover time into consideration. The setting unit 132 sets the larger one of the calculated block processing time and the predetermined preparation time as the block processing time of the block. The predetermined preparation time is the time taken to prepare production of the next group.

The knapsack problem formulation unit 133 formulates a knapsack problem in which a plurality of processing blocks to be processed are selected from among a plurality of blocks in such a way that a sum of the block processing times becomes large within a range of a predetermined operation time or less. The knapsack problem is the problem in which a knapsack of a fixed capacity is filled with items with specified values and volumes in such a way that a sum of the values is maximized. The predetermined operation time corresponds to the capacity of the knapsack. The predetermined operation time may be, for example, the length of business hours in a day. The value may be, for example, the block processing time. In such a case, the processing block is selected within the predetermined operation time in such a way that the working time becomes long. Furthermore, the block processing (finishing) time may be used as the value.

In a knapsack problem, a constraint may be imposed to ensure that a certain item is surely selected. If a delivery date is set for each of the plurality of ordered workpieces, the knapsack problem formulation unit 133 may formulate a knapsack problem so that the ordered workpiece whose delivery date is a predetermined date (e.g., on the day on which processing is performed on the workpiece) is included in any of the plurality of processing blocks selected.

In addition, the knapsack problem formulation unit 133 may formulate a knapsack problem so that the number of times of switching groups is reduced. That is, the knapsack problem formulation unit may formulate a knapsack problem so that the number of groups to which a plurality of ordered workpieces to be selected belong becomes small. By reducing the number of groups, the changeover time associated with switching of the groups can be reduced. The knapsack problem formulation unit 133 may reduce the number of groups by formulating the knapsack problem so that the selection of blocks with longer block processing time is prioritized. For example, the knapsack problem formulation unit 133 may set a value in the knapsack problem sufficiently high for blocks with long block processing times.

Further, it is considered that production efficiency decreases when the waiting time for preparation for the production in the processing apparatus increases. Therefore, the knapsack problem formulation unit 133 may formulate a knapsack problem so that the sum of preparation waiting times based on a difference between the predetermined preparation time and the block processing time becomes small. The preparation waiting time is a time obtained by subtracting the block processing time from the predetermined preparation time when the block processing time is smaller than the predetermined preparation time.

In addition, the knapsack problem formulation unit 133 may formulate a knapsack problem so that a block whose block processing time is less than the preparation time is less likely to be selected. For example, the knapsack problem formulation unit 133 may set the value in the knapsack problem lower for blocks with longer waiting times for preparation.

Furthermore, the knapsack problem formulation unit 133 may formulate a knapsack problem so that blocks with a margin until the delivery date and a long waiting time for preparation or changeover time in the block are not selected. For example, the knapsack problem formulation unit 133 may select a processing block from blocks other than such a block, or may set the value of such a block low. Such processing makes it possible to generate efficient schedules.

For a block with a sufficient time until the delivery date and a long waiting time for preparation or a long changeover time in the block, the knapsack problem formulation unit 133 may calculate a probability that workpieces belonging to the same group may be ordered on or after the next day, and formulate a knapsack problem so that a block whose probability is less than a predetermined value will not be selected. For groups whose probabilities are equal to or greater than the predetermined value, processing will be performed on or after the next day.

The selection unit 134 calculates a solution to the knapsack problem formulated by the knapsack problem formulation unit 133 by using the annealing processing unit 140, and selects the plurality of processing blocks based on the calculation result. The selection unit 134 selects workpieces to be processed according to the selection result. The production plan optimization apparatus 100c can determine the processing sequence in a manner similar to that in third example embodiment.

FIGS. 10 to 16 are overview diagrams showing specific examples of the operation of the Knapsack selection unit 130. Hereinafter, an example in which the Knapsack selection unit 130 selects workpieces to be processed in one day will be described. It is assumed that the order DB 181 records the delivery date of each workpiece by date. A plurality of workpieces shall be classified into the groups A to D.

First, an element block will be described with reference to FIG. 10. The Knapsack selection unit 130 first classifies the plurality of workpieces by their respective delivery dates. For example, among the workpieces belonging to the group A, a set of workpieces whose delivery dates are the day on which the processing work task is performed (such a day is referred to as a processing day) is defined as an element block 20$a$1. Similarly, a set of workpieces whose delivery dates are the day following the processing day is defined as an element block 20$a$2. Similarly, sets of workpiece whose delivery dates are due three, four, and five days after the processing day are referred to as element blocks 20$a$3, 20$a$4, and 20$a$5, respectively.

The workpieces belonging to the groups B, C and D are similarly classified into the element blocks 20$b$1 to 20$b$5, the element blocks 20$c$1 to 20$c$5, and the element blocks 20$d$1 to 20$d$5. Element blocks that do not include any workpiece are indicated by dotted lines. For example, the element block 20$b$5, indicated by the dotted line, indicates that there is no workpiece belonging to the group B whose delivery date is five days after the processing day.

Figure 11:
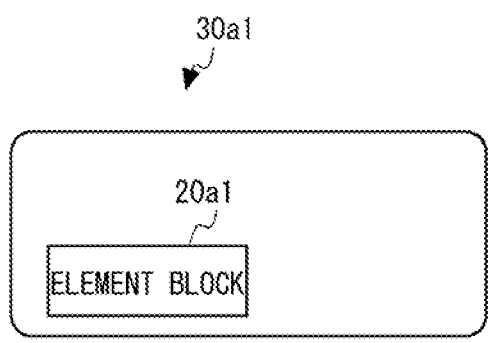
FIG. 11 is an overview diagram showing a block including one element block.
Figure 12:
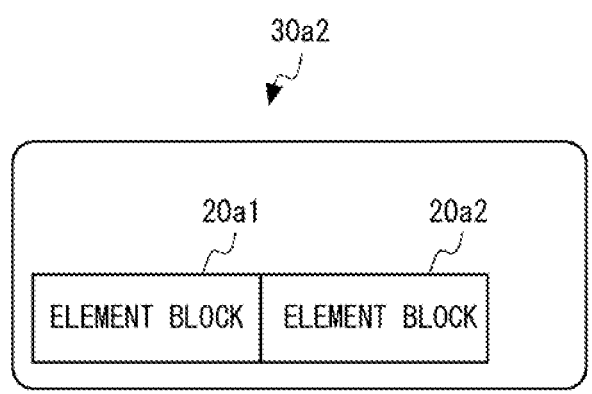
FIG. 12 is an overview diagram showing a block including a collection of two element blocks.
Figure 13:
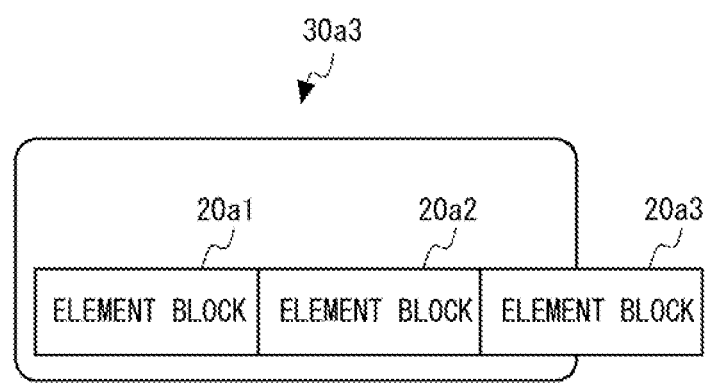
FIG. 13 is an overview diagram showing a block including a collection of three element blocks.
Figure 14:
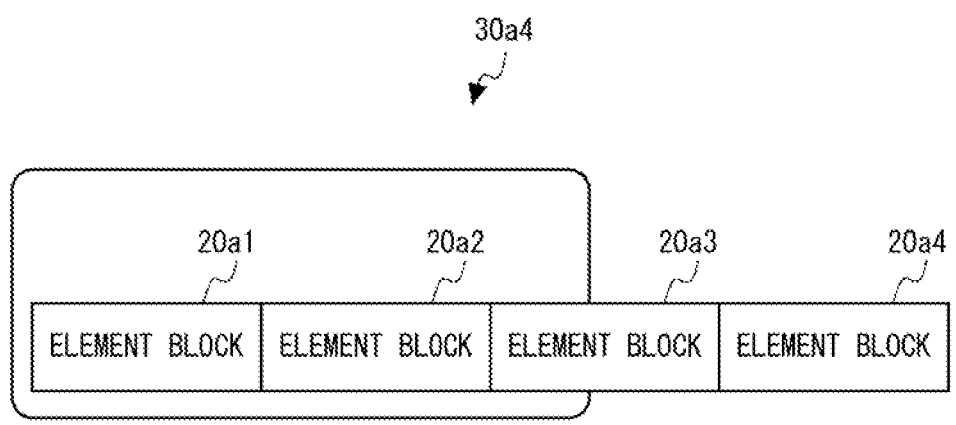
FIG. 14 is an overview diagram showing a block including a collection of four element blocks.
Figure 15:
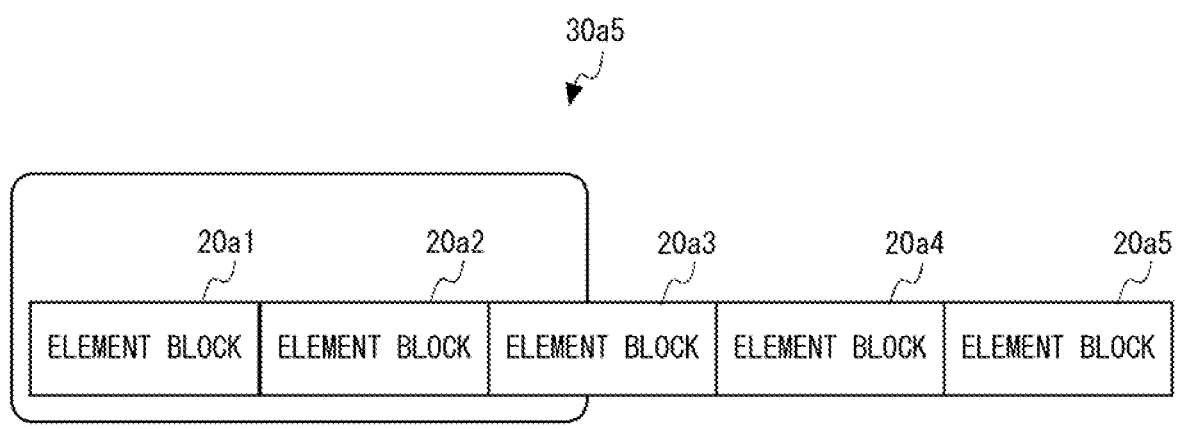
FIG. 15 is an overview diagram showing a block including a collection of five element blocks.

After the element block 20$a$1 to 20$d$5 are generated, the generation unit 131 connects the element blocks 20$a$1 to 20$d$5 in the sequence of delivery date to generate a plurality of blocks. The block 30$a$1 shown in FIG. 11 is composed of a single element block 20$a$1. The rounded rectangle represents the group preparation time. The block 30$a$2 shown in FIG. 12 is obtained by connecting the element blocks 20$a$1 and 20$a$2. The block 30$a$3 shown in FIG. 13 is obtained by connecting the element blocks 20$a$1 to 20$a$3. The block 30$a$4 shown in FIG. 14 is obtained by connecting the element blocks 20$a$1 to 20$a$4. The block 30$a$5 shown in FIG. 15 is obtained by connecting the element blocks 20$a$1 to 20$a$5. The blocks other than the group A are generated in a similar manner to the group A.

Here, the block processing times of the blocks 30$a$1 to 30$a$5 are the larger ones of the block processing times and the group preparation times. In each of FIGS. 11 to 15, the width of the rounded rectangle represents the group preparation time. The block processing time is also called a length of a block. If the number of ordered workpieces included in the block is large, the length of the block is the block processing time, whereas if the number of workpieces included in the block is small, the length of the block is the group preparation time.

The time required for the processing work task may be determined by determining the sequence by solving the traveling salesman problem in which each city is regarded as each of the ordered workpieces included in the block, and then adding the sum of the changeover times according to the sequence and the sum of the processing times of the respective workpieces.

In FIGS. 11 to 15, the lengths of the blocks 30$a$1 and 30$a$2 are the group preparation times and the lengths of the blocks 30$a$3 to 30$a$5 are the block processing times. In processing of the blocks 30$a$1 and 30$a$2, a waiting time is expected to occur. In each of FIGS. 11 and 12, a difference between the width of the rounded rectangle and the length of the element block corresponds to the preparation waiting time.

Figure 16:
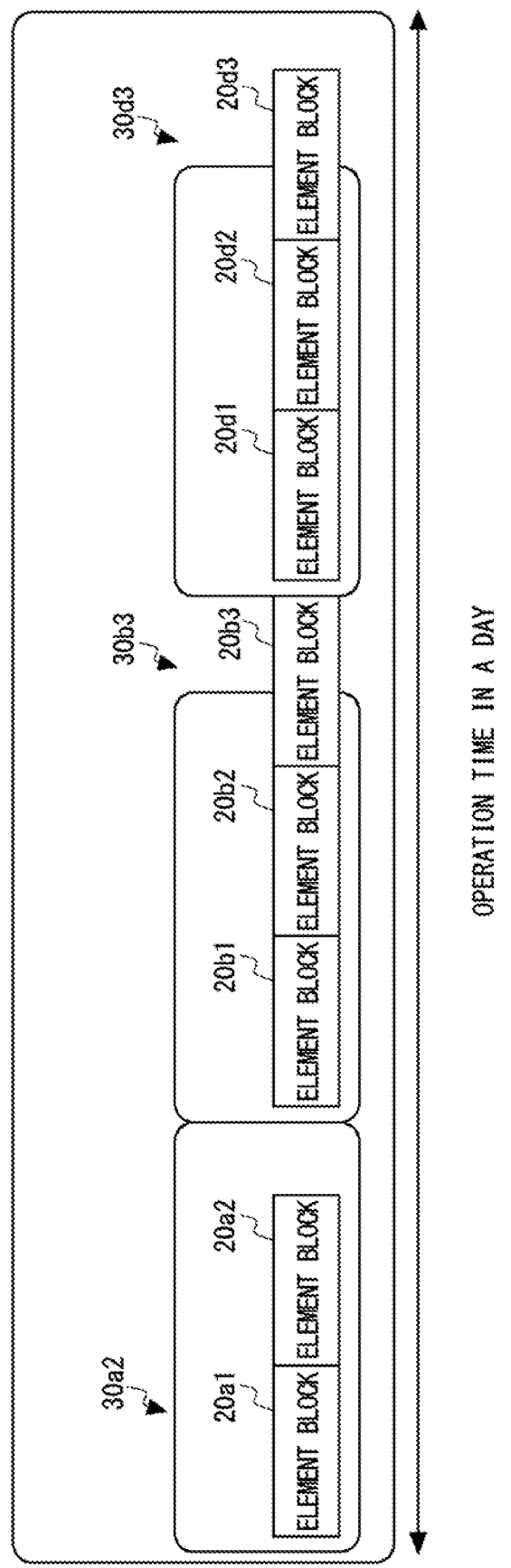
FIG. 16 is an overview diagram showing an overview of a knapsack problem.

FIG. 16 is an overview diagram showing an example of a knapsack problem to be formulated by the knapsack selection unit 130. The knapsack problem is formulated to select a processing block to be processed in an operation time in a day under predetermined constraint conditions. The constraint conditions are to ensure that no more than one block including the same element blocks is selected, and to ensure that a group including a workpiece due on the processing day is selected. For example, if blocks as shown in FIG. 16 are selected, the ordered workpieces included in the blocks 30$a$2, 30$b$3, and 30$d$3 will be processed on the processing day. The ordered workpiece included in the unselected element blocks 20$a$4, 20$a$5, 20$b$4, 20$c$3, 20$c$4, and 20$d$5 among the element blocks in FIG. 10 will be processed on or after the next day.

Figure 17:
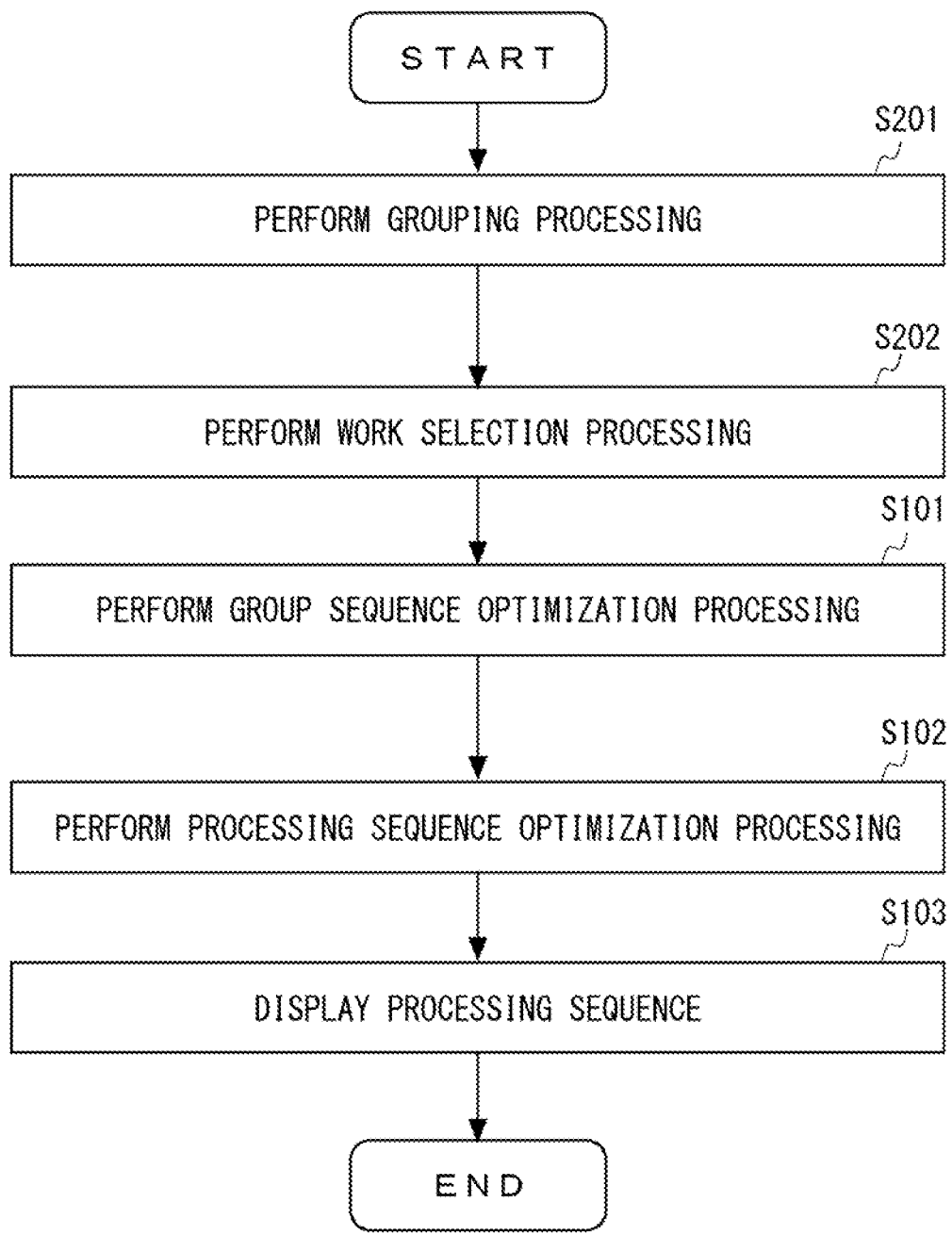
FIG. 17 is a flowchart showing an operation of a production plan optimization apparatus according to a fourth example embodiment.

The operation of the production plan optimization apparatus 100$c$ is described with reference to FIG. 17. First, the production plan optimization apparatus 100$c$ performs processing to classify the ordered workpieces included in the order DB 181 into groups (Step S201). Next, the production plan optimization apparatus 100$c$ performs processing to select the workpieces to be processed from among the classified workpieces (Step S202). Here, the production plan optimization apparatus 100$c$ may select the workpieces so that the number of times of switching groups is reduced as much as possible, or select the workpieces so that the preparation waiting time is reduced as much as possible. Since the processing for determining the sequence in which the plurality of workpieces are processed selected in Step S202 (Step S101 to 103) is the same as that according to the third example embodiment, description thereof is omitted.

According to the fourth example embodiment, it is possible to select workpieces to be processed in a predetermined operation time, taking group preparation time into consideration. In addition, by properly formulating a knapsack problem, it is possible to select workpieces that include all workpieces due on a day when processing is to be performed, so that the number of times of switching groups and a preparation waiting time is reduced. Furthermore, by controlling an apparatus according to a determined sequence, it is possible to reduce the cost of manufacturing a plurality of products by using an apparatus such as a processing apparatus and a manufacturing apparatus.

Although the present disclosure has been described above with reference to the above example embodiments, the present disclosure is not limited to the above example embodiments and can be changed accordingly without departing from the scope of the disclosure.

The whole or part of the example embodiments disclosed above can be described as, but not limited to, the following supplementary notes.

(Supplementary Note 1)

A production plan optimization apparatus comprising:
  traveling salesman problem formulation means for formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and
  processing sequence determination means for calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation.

(Supplementary Note 2)

The production plan optimization apparatus according to Supplementary note 1, wherein the plurality of workpieces are classified into a plurality of groups so that a combination of the workpieces having a short changeover time belongs to the same group, the production plan optimization apparatus further comprises group sequence determining means for determining a sequence in which the plurality of groups are processed as a group sequence, and the traveling salesman problem formulation means formulates the problem as the traveling salesman problem that satisfies the delivery date constraint and the sequence constraint including a constraint based on the group sequence and also minimizes the sum.

(Supplementary Note 3)

The production plan optimization apparatus according to Supplementary note 1, wherein the changeover time between the workpieces belonging to different groups includes a group preparation time required for preparing production of the group to which the workpiece to be switched belongs, and the production plan optimization apparatus further comprises jobshop problem formulation means for formulating a jobshop problem that minimizes a sum of waiting times in a processing apparatus when processing of the group for which the preparation for the production is made is started in the processing apparatus after the preparation for the production has been made outside the processing apparatus, and the group sequence determination means uses the annealing processing means to calculate a solution to the jobshop problem and determines the group sequence based on a result of the calculation.

(Supplementary Note 4)

The production plan optimization apparatus according to Supplementary note 3, wherein the plurality of workpieces are selected from among a plurality of ordered workpieces, and each of the plurality of ordered workpieces is classified into the plurality of groups, and the production plan optimization apparatus further comprises:

generation means for generating one or a plurality of blocks combining the ordered workpieces classified into the group for each of the plurality of groups;

setting means for calculating, for each of the plurality of blocks generated by the generation means, a block processing time required for processing the ordered workpieces included in the block and setting a larger one of the block processing time and a predetermined preparation time as the block processing time of the block;

knapsack problem formulation means for formulating a knapsack problem in which a plurality of processing blocks to be processed are selected from the plurality of blocks so that a sum of the block processing times becomes large within a range of a predetermined operation time or less; and selection means for calculating a solution to the knapsack problem by using the annealing processing means, selecting the plurality of processing blocks based on a result of the calculation, and selecting the plurality of ordered workpieces according to a result of the selection.

(Supplementary Note 5)

The production plan optimization apparatus according to Supplementary note 4, wherein the delivery date is set for each of the plurality of ordered workpieces, and the knapsack problem formulation means formulates the knapsack problem so that the ordered workpiece whose delivery date is a predetermined date is included in one of the plurality of processing blocks.

(Supplementary Note 6)

The production plan optimization apparatus according to Supplementary note 4 or 5, wherein the knapsack problem formulation means formulates the knapsack problem so that the number of groups to which the plurality of ordered workpieces selected by the selection means belong becomes small.

(Supplementary Note 7)

The production plan optimization apparatus according to any one of Supplementary notes 4 to 6, wherein the knapsack problem formulation means formulates the knapsack problem so that a sum of preparation waiting times based on a difference between the predetermined preparation time and the block processing time becomes small.

(Supplementary Note 8)

The production plan optimization apparatus according to any one of Supplementary notes 4 to 7, wherein the knapsack problem formulation means formulates the knapsack problem so that blocks with long changeover times are less likely to be selected.

(Supplementary Note 9)

A production plan optimization method for causing a computer to execute:

formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation.

(Supplementary Note 10)

A non-transitory computer readable medium storing a production plan optimization program for causing a computer to execute:

processing of formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and processing of calculating a solution to the traveling salesman problem, by using annealing processing means for searching for an optimal solution to a combinatorial optimization problem, and determining the sequence in which the plurality of workpieces are processed based on a result of the calculation.

(Supplementary Note 11)

A control apparatus comprising:

traveling salesman problem formulation means for formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces;

processing sequence determination means for calculating a solution to the traveling salesman problem, by using annealing processing means for searching for an optimal solution to a combinatorial optimization problem by simulated annealing or quantum annealing, and determining the sequence in which the plurality of workpieces are processed based on a result of the calculation; and control means for controlling a processing apparatus for processing the plurality of workpieces according to the sequence in which the plurality of workpieces are processed determined by the processing sequence determination means.

(Supplementary note 12)

The control apparatus according to Supplementary note 11, wherein the plurality of workpieces are classified into a plurality of groups so that a combination of the workpieces having a short changeover time belongs to the same group, the control apparatus further comprises group sequence determining means for determining a sequence in which the plurality of groups are processed as a group sequence, and the traveling salesman problem formulation means formulates the problem as the traveling salesman problem that satisfies the delivery date constraint and the sequence constraint including a constraint based on the group sequence and also minimizes the sum.

(Supplementary Note 13)

The control apparatus according to Supplementary note 12, wherein the changeover time between the workpieces belonging to different groups includes a group preparation time required for preparing production of the group to which the workpiece to be switched belongs, and the control apparatus further comprises jobshop problem formulation means for formulating a jobshop problem that minimizes a sum of waiting times in the processing apparatus when processing of the group for which the preparation for the production is made is started in the processing apparatus after the preparation for the production has been made outside the processing apparatus, and the group sequence determination means uses the annealing processing means to calculate a solution to the jobshop problem and determines the group sequence based on a result of the calculation.

(Supplementary Note 14)

The control apparatus according to Supplementary note 13, wherein the plurality of workpieces are selected from among a plurality of ordered workpieces, and each of the plurality of ordered workpieces is classified into the plurality of groups, and the control apparatus further comprises:

generation means for generating one or a plurality of blocks combining the ordered workpieces classified into the group for each of the plurality of groups;

setting means for calculating, for each of the plurality of blocks generated by the generation means, a block processing time required for processing the ordered workpieces included in the block and setting a larger one of the block processing time and a predetermined preparation time as the block processing time of the block;

knapsack problem formulation means for formulating a knapsack problem in which a plurality of processing blocks to be processed are selected from the plurality of blocks so that a sum of the block processing times becomes large within a range of a predetermined operation time or less; and selection means for calculating a solution to the knapsack problem by using the annealing processing means, selecting the plurality of processing blocks based on a result of the calculation, and selecting the plurality of ordered workpieces according to a result of the selection.

(Supplementary note 15)

The control apparatus according to Supplementary note 14, wherein the delivery date is set for each of the plurality of ordered workpieces, and the knapsack problem formulation means formulates the knapsack problem so that the ordered workpiece whose delivery date is a predetermined date is included in one of the plurality of processing blocks.

(Supplementary Note 16)

The control apparatus according to Supplementary note 14 or 15, wherein the knapsack problem formulation means formulates the knapsack problem so that the number of groups to which the plurality of ordered workpieces selected by the selection means belong becomes small.

(Supplementary Note 17)

The control apparatus according to any one of Supplementary notes 14 to 16, wherein the knapsack problem formulation means formulates the knapsack problem so that a sum of preparation waiting times based on a difference between the predetermined preparation time and the block processing time becomes small.

(Supplementary Note 18)

The control apparatus according to any one of Supplementary notes 14 to 17, wherein the knapsack problem formulation means formulates the knapsack problem so that blocks with long changeover times are less likely to be selected.

(Supplementary Note 19)

A control apparatus comprising:

annealing processing means for calculating an evaluation value for a total time of a switching time required to process a plurality of workpieces in a sequence in which the plurality of workpieces are processed by using a changeover time indicating a time taken for switching at least two workpieces among the plurality of workpieces and a constraint condition on the sequence in which some of the workpieces are processed and determining the sequence in which the workpieces are processed when a condition that the calculated evaluation value is evaluated as being small is satisfied; and control means for controlling an apparatus for executing the processing on the plurality of workpieces according to the determined sequence in which the plurality of workpieces are processed.

REFERENCE SIGNS LIST a1 to 3a3, 3b1 to 3b3, 3c1 to 3c3 NODE
4a1 to 4a2, 4b1 to 4b4, 4c1 to 4c3, 4d1 to 4d3, 4e1 to 4e4, 4f1 to 4f2 WORK PROCESSING TIME
5, 5a1, 5b1 to 5b3, 5c1 to 5c2, 5x to 5z CHANGEOVER TIME
6, 6x, 6y WAITING TIME
7a, 7b, 7c GROUP PREPARATION TIME
20a1 to 20a5, 20b1 to 20b5, 20c1 to 20c5, 20d1 to 20d5 ELEMENT BLOCK
30a1 to 30a5, 30b3, 30d3 BLOCK
50a, 50b, 50c, 50d SCHEDULE
60 TIME CHART
100, 100a, 100b, 100c PRODUCTION PLAN OPTIMIZATION APPARATUS
110 TSP PROCESSING SEQUENCE OPTIMIZATION UNIT
111 TRAVELING SALESMAN PROBLEM FORMULATION UNIT
112 PROCESSING SEQUENCE DETERMINATION UNIT
120 JOBSHOP PROCESSING SEQUENCE OPTIMIZATION UNIT
121 JOB SHOP PROBLEM FORMULATION UNIT
122 GROUP SEQUENCE DETERMINATION UNIT
130 KNAPSACK SELECTION UNIT
131 GENERATION UNIT
132 SETTING UNIT
133 KNAPSACK PROBLEM FORMULATION UNIT
134 SELECTION UNIT
140 ANNEALING PROCESSING UNIT
150 CONTROL UNIT
160 DISPLAY UNIT
170 OPERATION INPUT UNIT
181 ORDER DB
182 CHANGEOVER TIME DB
183 GROUP PREPARATION TIME DB

What is claimed is:

1. A control apparatus comprising:
at least one memory storing instructions; and
at least one processor configured to execute the instructions to:
  formulate a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces;
  calculate a solution to the traveling salesman problem, by using an annealing processing machine for searching for an optimal solution to a combinatorial optimization problem by simulated annealing or quantum annealing, and determine the sequence in which the plurality of workpieces are processed based on a result of the calculation; and
  controlling a processing apparatus to physically process the plurality of workpieces according to the sequence determined based on the result of the calculation.

2. The apparatus according to claim 1, wherein
the plurality of workpieces are classified into a plurality of groups so that a combination of the workpieces having a short changeover time belongs to the same group, and
the at least one processor is further configured to execute the instructions to:
  determine a sequence in which the plurality of groups are processed as a group sequence, and
  formulate the problem as the traveling salesman problem that satisfies the delivery date constraint and the sequence constraint including a constraint based on the group sequence and also minimizes the sum.

3. The apparatus according to claim 1, wherein
the changeover time between the workpieces belonging to different groups includes a group preparation time required for preparing production of the group to which the workpiece to be switched belongs, and
the at least one processor is further configured to execute the instructions to:
  formulate a jobshop problem that minimizes a sum of waiting times in a processing apparatus when processing of the group for which the preparation for the production is made is started in the processing apparatus after the preparation for the production has been made outside the processing apparatus, and
  use the annealing processing machine to calculate a solution to the jobshop problem and determine the group sequence based on a result of the calculation.

4. The apparatus according to claim 3, wherein
the plurality of workpieces are selected from among a plurality of ordered workpieces, and
each of the plurality of ordered workpieces is classified into the plurality of groups, and
the at least one processor is further configured to execute the instructions to:
  generate one or a plurality of blocks combining the ordered workpieces classified into the group for each of the plurality of groups;
  calculate, for each of the plurality of blocks, a block processing time required for processing the ordered workpieces included in the block and set a larger one of the block processing time and a predetermined preparation time as the block processing time of the block;
  formulate a knapsack problem in which a plurality of processing blocks to be processed are selected from the plurality of blocks so that a sum of the block processing times becomes large within a range of a predetermined operation time or less; and
  calculate a solution to the knapsack problem by using the annealing processing machine, select the plurality of processing blocks based on a result of the calculation, and select the plurality of ordered workpieces according to a result of the selection.

5. The apparatus according to claim 4, wherein
the delivery date is set for each of the plurality of ordered workpieces, and
the at least one processor is further configured to execute the instructions to:

formulate the knapsack problem so that the ordered workpiece whose delivery date is a predetermined date is included in one of the plurality of processing blocks.

6. The apparatus according to claim 4, wherein
the at least one processor is further configured to execute the instructions to:
formulate the knapsack problem so that the number of groups to which the plurality of ordered workpieces belong becomes small.

7. The production plan optimization apparatus according to claim 4, wherein
the at least one processor is further configured to execute the instructions to:
formulate the knapsack problem so that a sum of preparation waiting times based on a difference between the predetermined preparation time and the block processing time becomes small.

8. The apparatus according to claim 4, wherein
the at least one processor is further configured to execute the instructions to:
formulate the knapsack problem so that blocks with long changeover times are less likely to be selected.

9. The control apparatus according to claim 1, further comprising the annealing processing machine.

10. A control method for causing a computer to execute:
formulating a problem regarding determining a sequence in which a plurality of workpieces are processed as a traveling salesman problem that satisfies a delivery date constraint based on a delivery date specified for at least one of the plurality of workpieces and a sequence constraint specified for at least one of combinations of the plurality of workpieces and also minimizes a sum of changeover times associated with switching of the workpieces; and
calculating a solution to the traveling salesman problem, by using an annealing processing machine for searching for an optimal solution to a combinatorial optimization problem by simulated annealing or quantum annealing, and determining the sequence in which the plurality of workpieces are processed based on a result of the calculation; and
controlling a processing apparatus to physically process the plurality of workpieces according to the sequence determined based on the result of the calculation.

11. A non-transitory computer readable medium storing a control program for causing a computer to execute the control method according to claim 10.

* * * * *